United States Patent [19]

Adams et al.

[11] Patent Number: 5,004,028
[45] Date of Patent: Apr. 2, 1991

[54] SHEAR HUB

[75] Inventors: James Adams, Memphis, Tenn.; Richard Gobel, Scappoose; Bryan Lanham, Gresham, both of Oreg.

[73] Assignee: Beloit Corporation, Beloit, Wis.

[21] Appl. No.: 543,255

[22] Filed: Jun. 25, 1990

[51] Int. Cl.⁵ .............................................. B27C 1/00
[52] U.S. Cl. .................... 144/176; 74/665 B; 241/32; 241/92; 144/172
[58] Field of Search ............ 144/162 R, 172, 173, 144/174, 176; 74/665 R, 665 B, 665 C; 241/32, 92, 207, 208, 215, 278 R, 85

[56] References Cited

U.S. PATENT DOCUMENTS

| | | | |
|---|---|---|---|
| 3,000,577 | 9/1961 | Ferguson | 241/32 |
| 3,838,823 | 10/1974 | Lewis | 241/32 |
| 3,840,187 | 10/1974 | Brewer | 241/32 |
| 4,604,035 | 8/1986 | Roberts | 241/32 |
| 4,770,217 | 9/1988 | Strong | 144/176 |
| 4,827,989 | 5/1989 | Strong | 144/176 |
| 4,858,834 | 8/1989 | Lanham | 241/85 |
| 4,892,257 | 1/1990 | Stoeckmann et al. | 241/32 |

Primary Examiner—W. Donald Bray
Attorney, Agent, or Firm—Dirk J. Veneman; Raymond W. Campbell

[57] ABSTRACT

A chip slicer for slicing wood chips such as for use in a pulp preparation procedure with an annular housing having knives therein and a rotor therein with anvil means for carrying wood chips against the knives with a shaft extending coaxially for diving the rotor, a driving hub mounted on the shaft and connected to it, a driven hub rotatably mounted by bearings on the driving hub with each of the hubs having annular plates and shear pins extending axially between the plates of a strength to transmit normal rotational power and to shear upon forced stalling of the rotor with the driven hub permitting continued rotation of the driving hub within the driven hub and continued rotation of the shaft with forced stalling of the rotor.

14 Claims, 2 Drawing Sheets

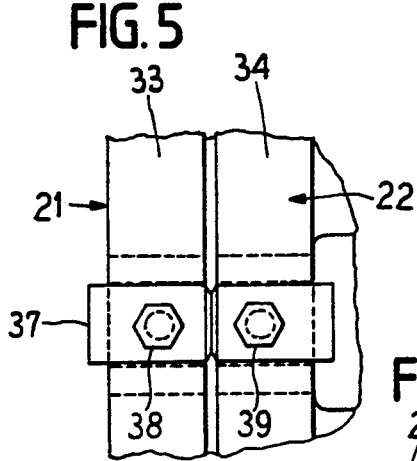
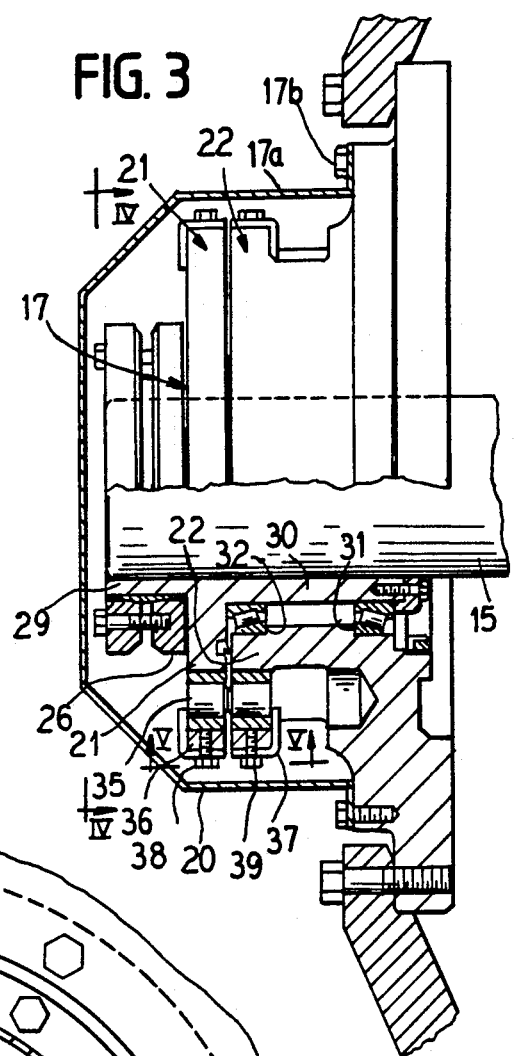
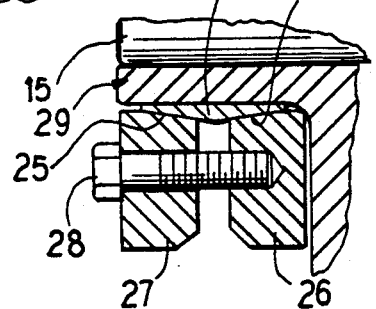
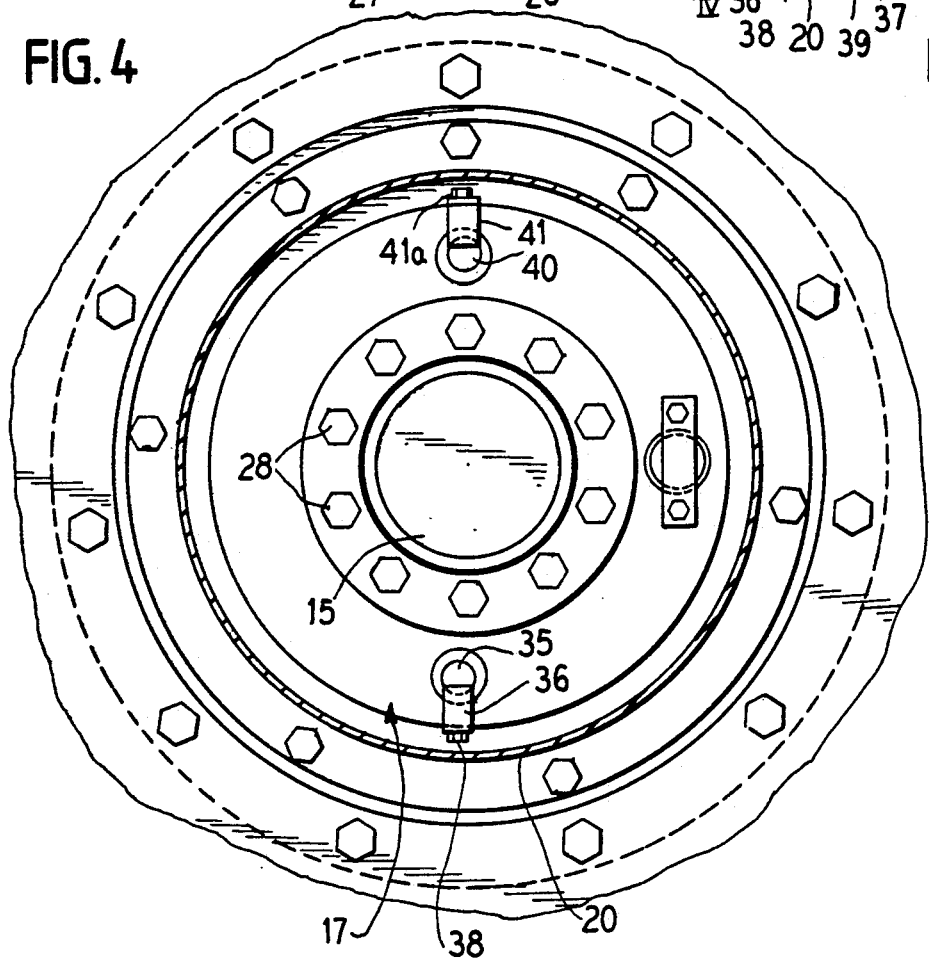

SHEAR HUB

BACKGROUND OF THE INVENTION

The present invention relates to improvements in mechanisms for preparing pulp for papermaking machines, and more particularly to an apparatus for slicing wood chips.

In the paper industry, wood pulp is made by subjecting wood chips to a chemical digestion process wherein the compounds and chemical systems holding the fibers together, such as lignin, are dissolved to thereby liberate the individual wood fibers which are then diluted with water and introduced into a papermaking machine to make paper or paperboard products. The preparation of the wood chips is a critical part of the process in that, ideally, the wood chips should be of uniform thickness so that the chemicals penetrate the chips equally during the digestion process. If not properly formed, the chips may not be sufficiently penetrated to liberate the wood fibers, or if the chips are too thin, the chemicals may penetrate the chips too rapidly or for a longer time than necessary to liberate the individual fibers. The fibers themselves may be deleteriously weakened, or shortened or both.

The thickness of the individual wood chips is defined in the direction extending radially relative to the longitudinal axis of the log. Control of cutting the chips is difficult since the chips are sometimes gouged or broken out in chunks as a result of knots and compression. To ensure consistent chip size, screening systems are used to separate out oversize chips, which are directed to apparatus for reducing the size of the chips. Commercial type wood rechippers take various forms, and one successful form has been a rotary rechipper or chip slicer having a drum in which a rotor with vanes or anvils carries the wood in a rotary path to force the wood against knives circumferentially placed around the rotor.

A typical mechanism for slicing or rechipping wood chips is shown and described in U.S. Pat. No. 4,858,834. In a mechanism of this type, despite care taken in the feeding of the wood chips, foreign elements such as tramp iron may accompany the infeed of wood which is to be rechipped. When such tramp iron is caught by the rotor and carried against a knife, the rotor may be immediately forcibly stalled. With substantial input power, the chipper can be severely damaged and torn apart if power input continues and the rotor is not allowed to stall. Eventually, breakage will have to occur in different parts of the drive train as well as in the chipper if no provision for such unforeseen stalling is made. One attempt at providing for malfunctioning due to tramp iron and other failures which cause stalling of the rotor is to provide a hydraulic coupling between the drive and the rotor. This structure has not worked satisfactorily, and substantial equipment damages has resulted when the hydraulic coupling has not released, causing major down-time for customers with manufacturing and repair costs.

It is accordingly an object of the present invention to provide an improved chip slicer for use in a pulp preparation procedure which is capable of more continued satisfactory operation and the avoidance of costly equipment damage due to the intake of foreign objects into the slicer.

A further object of the invention is to provide an improved drive train arrangement for a chip slicer wherein the drive train arrangement takes care of malfunctioning and stalling of the chip slicer.

A further object of the invention is to provide an improved safety drive for a chip slicer wherein stalling of the rotor will be accommodated, and the drive train is constructed in a simplified and improved manner minimizing damages to the equipment with stalling, and permitting rapid repair with a minimum of down-time and minimum of cost.

FEATURES OF THE INVENTION

In accordance with the principles of the invention, a chip slicing apparatus is provided with a power input drive shaft leading to the rotor wherein the rotor has anvil means for carrying wood chips against cutting knives mounted within the housing. A power rotation clutch means is provided between the power input and the rotor which is capable of accommodating the normal input power but which also accommodates immediate interruption of the direct connection between the rotor and drive input with forced stalling of the rotor. The arrangement is particularly well adapted to use in existing chip slicers, and involves substitution of enlarged bearings for the previously existing bearings and the provision of a driving hub which is radially clamped to the power input shaft and which supports a driven hub mounted on large bearings. The hubs have radially extending plates with axial holes to accommodate shear pins which carry the drive torque between the driving hub and the driven hub. With forced stalling or overload on the rotor, the shear pins will automatically and immediately shear without damaging the parts, and the input drive hub will continue rotation on the bearings. The shear pins are exposed and particularly accessible, making replacement easy so that the drive mechanism can be made ready for operation as quickly as the rotor can be repaired or the fault which stalled the rotor can be rectified. The arrangement is such that it is simple in structure and fully exposed for access for repair. The necessity for relatively expensive and unreliable hydraulic coupling means is eliminated, and a safety arrangement is provided which has not been available in structures heretofore used.

Other objects, advantages and features will become more apparent with the teaching of the principles of the invention in connection with the disclosure of the preferred embodiments thereof in the specification, claims and drawings in which:

DESCRIPTION OF THE DRAWINGS

FIG. 3 is an enlarged sectional view taken through the drive arrangement for the chip slicer of FIGS. 1 and 2;

FIG. 4 is a sectional view taken substantially along line IV—IV of FIG. 3;

FIG. 5 is an enlarged detailed fragmentary sectional view taken substantially along line V—V of FIG. 3; and FIG. 6 is an enlarged detailed fragmentary sectional view illustrating a portion of the drive arrangement.

DESCRIPTION OF THE PREFERRED EMBODIMENT

Figure 1:
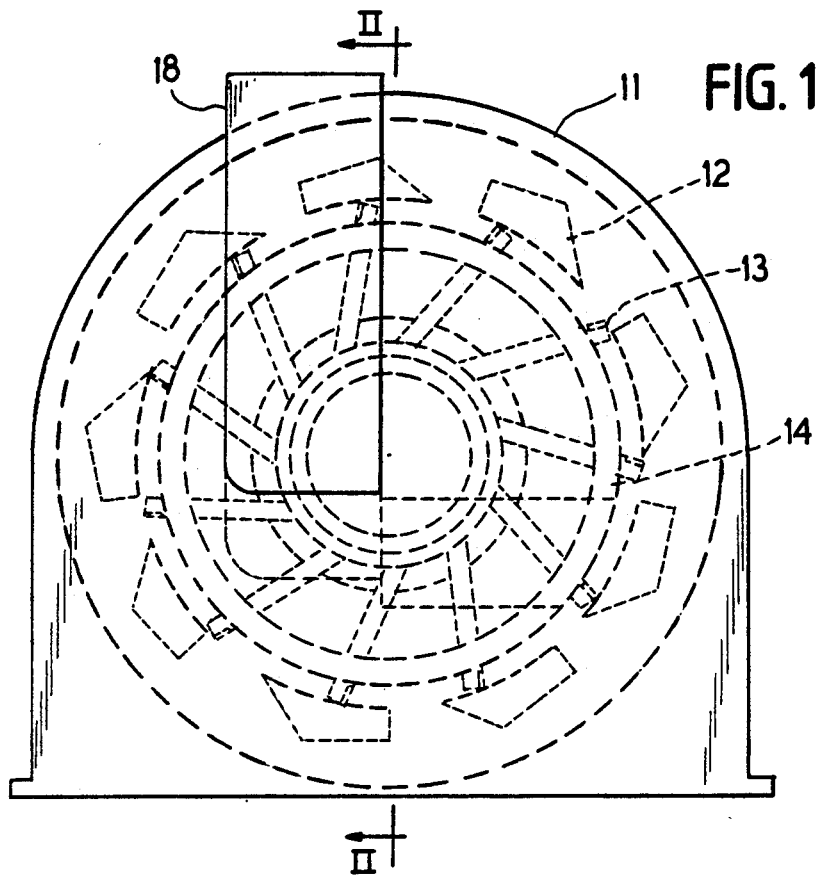
FIG. 1 is an elevational view of a chip slicer of the type used for reducing the size of oversize chips in pulp preparation for papermaking processes.
Figure 2:
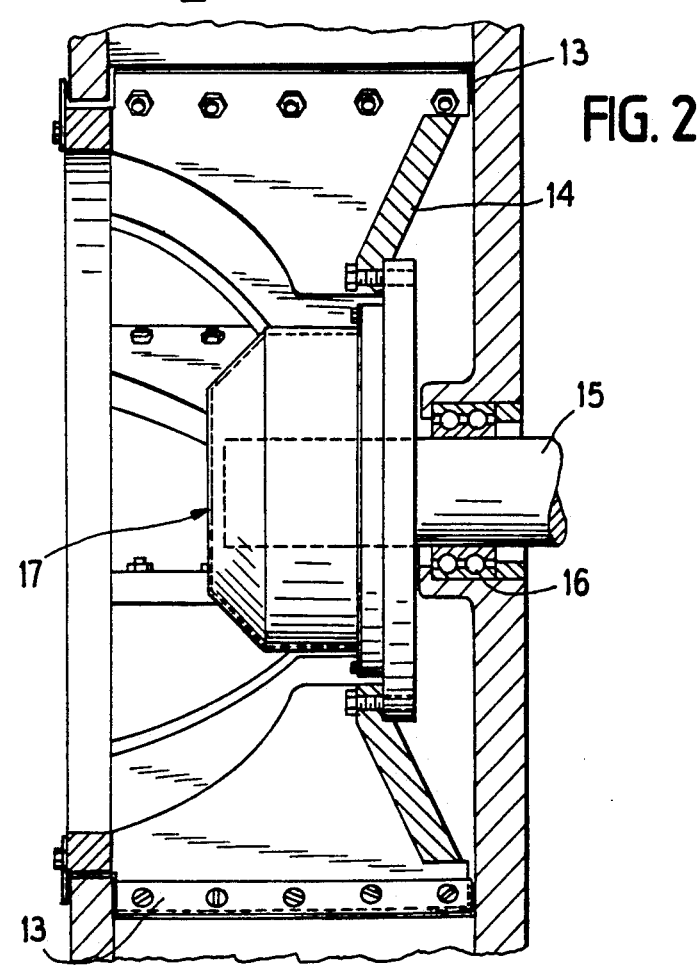
FIG. 2 is a vertical sectional view taken substantially along line II—II of FIG. 1.

FIGS. 1 and 2 illustrate a chip slicer constructed with a cylindrical housing 11 providing a chamber therein wherein the wood chips are cut. For cutting the chips, a plurality of knives 12 are mounted within the housing, arranged circumferentially and having leading cutting edges so that as the wood pieces are carried around in a counter-clockwise direction as shown in FIG. 1, the wood will be brought against the knives to be cut and form acceptable size chips. Various arrangements may be used for controlling the size of the chips, such as adjustment on the knives, and the adjustment may be provided by slots which are located in advance of the knives. Such mechanisms will be recognized by those versed in the art and need not be described in detail herein. A form of chip slicer is shown in U.S. Pat. No. 4,235,382 wherein the knives are mounted in slots and an overall chip slicer is also illustrated in the aforementioned U.S. Pat. No. 4,858,834.

Within the cylindrical drum 11 is a rotor 14. The rotor carries anvils 13 at its outer periphery which extend axially along the rotor, and these anvils bring the wood against the knives 12. Power input for driving the rotor is derived from a shaft 15 which is supported in a bearing 16 in the housing, FIG. 2. The power input from the input shaft 15 is transmitted through a power rotation clutch means shown generally at 17 and described in further detail in FIGS. 3 through 6.

Wood is fed in through a chute 18 leading into the center of the rotor so that in operation an infeed of wood will occur to be rechipped by the driven rotor forcing the wood against the knives. In the event of the inadvertent feeding in of foreign elements such as tramp iron, the foreign elements may be of such a size that the driven rotor is stalled. Obviously, some injury will occur to the knives, but it is essential in accordance with the principles of the invention, that the stalling be accompanied by an immediate break or relief of the input drive so that continued torque is not applied to the rotor. In this way damage to the rotor and knives is minimized.

Torque applied to the rotor is transmitted thereto from a drive source through the shaft 15 and the clutch arrangement shown generally at 17 in FIGS. 3 and 4, which is covered by a readily removable sheet metal cover 17a held onto the main housing by bolts 17b. For driving the rotor, the power input from the shaft 15 is transmitted through a driving hub 21 attached on the drive shaft 15 to a driven hub 22 secured to the rotor.

The driving hub 21 has an elongate sleeve 30, FIG. 3, mounting it on the shaft 15. The sleeve has an extension 29 which is clamped tightly on the shaft to transmit rotation. For clamping the driving hub 21 firmly on the shaft, a ring fedder is used to provide a crush fit of the extension 29 on the shaft 15. Other means may be used for attaching the driving hub to the shaft, such as keys; however, the ring fedder has been found to work well. The ring fedder includes a band 23 having outer surfaces 24 and 25 which are tapered. Two annular rings 26 and 27 are forced together axially, and tend to climb the surfaces 24 and 25 and apply a strong radial force to the band 23, which firmly clamps the extension 29 of the driving hub onto the shaft 15. The rings 26 and 27 have annular angular faces which mate with the surfaces 24 and 25 of the collar 23, and a series of bolts 28 extend through holes in the ring 27 and are threaded into the ring 26 so that when the bolts 28 are tightened, the rings 26 and 27 are pulled together to apply radial force to the collar 23 and clamp the driving hub onto the shaft.

The driven hub 22 is driven by the driving hub 21 through shear pins 35 and 40, FIGS. 3 and 4. For the purpose of effective use of the shear pins, and for ready access and removal, each of the driving and driven hubs extend radially outwardly beyond the ring fedder assembly. The outer regions of the hubs have axially extending holes spaced 180° apart for receiving the shear pins 35 and 40. While two shear pins are shown and described, a single shear pin may be used in some embodiments, and in other embodiments more than two shear pins may be used. The references hereinafter to the two shear pins are equally descriptive of embodiments having one, two, or more shear pins.

The shear pin 35 is held in its driving location within the holes by retainer clips 36 and 37. The retainer clips are held by bolts 38 and 39 threaded into the edges 33 and 34 of driving and driven hubs 21 and 22. Other types of holding devices known to those skilled in the art also may be used.

If the shear pins are sheared, either or both bolts 38 and 39 may be removed to remove the clips 36 and 37 and push the broken parts of the shear pin out to insert a new shear pin. The shear pin 40 is held similarly by clips, one of which designated with numeral 41 is shown in FIG. 4 held by a bolt 41a similar to the detailed structure shown in FIG. 3 for the shear pin 35.

Upon shearing of the pins 35 and 40, the drive shaft and the driven hub 21 are free to rotate freely on large, axially spaced bearings 31 and 32 between the driven hub and driving hub. These bearings function to center the driving hub on the driven hub in normal operation, but will permit the driving hub to spin freely within the driven hub when the rotor has been forcibly stalled and the shear pins have sheared.

In operation, driving power is transmitted to the chip slicer by suitable motive means connected to the shaft 15. The shaft 15 drives the driving hub 21 because the driving hub is firmly clamped to the shaft by the ring fedder assembly.

The driving hub 21 drives the driven hub through the shear pins 35 and 40 which transmit rotary power to the driven hub 22 which is firmly connected to the rotor 14.

The shear pins are designed to be of a strength to continue to drive under normal operating forces but to immediately shear and break when the rotor is forcibly stalled or encounters an abnormal overload. Thus, the drive arrangement provides protection not only at the point of forcible stalling, but at a point when abnormal overloads are encountered which might cause damage to the anvils of the rotor or the knives of the housing. When stalling or overload occurs, the drive shaft and its driving hub 21 spin freely within the driven hub. The operator can then shut down the power, determine what has caused the abnormal overload or forcible stalling of the rotor, and remove and replace the shear pins.

Thus, it will be seen that there has been provided an improved arrangement for wood chip slicing which meets the objectives and advantages above set forth and provides a direct, readily accessible structure for the operator.

We claim as our invention:

1. An apparatus for slicing wood chips such as for use in a paper pulp preparation procedure, comprising in combination:

a power input rotary drive shaft;

a rotor having anvil means for carrying wood chips against cutting knives and adapted to be driven by said shaft;

a driven hub rotatably mounted on the drive shaft;

bearing means between the drive shaft and the driven hub;

a driving hub nonrotatably secured to the drive shaft;

shear means rotatably connecting the driven hub to the driving hub to transmit rotation therebetween;

said shear means being of a strength to transmit rotational power between the hubs with normal operation of the rotor and to allow relative rotation with forced stalling of the rotor;

and means connecting the driven hub to the rotor.

2. An apparatus for slicing wood chips such as in a pulp preparation procedure constructed in accordance with claim 1:

including first and second radial extensions respectively of said driven hub and said driving hub, with said shear means extending between said first and second radial extensions.

3. An apparatus for slicing wood chips such as in a pulp preparation procedure constructed in accordance with claim 2:

wherein said shear means are in the form of axially extending pins projecting between said extensions.

4. An apparatus for slicing wood chips such as in a pulp preparation procedure constructed in accordance with claim 3:

wherein said pins are spaced 180° apart on said extensions and are disposed in mating aligned openings in the plates.

5. An apparatus for slicing wood chips such as in a pulp preparation procedure constructed in accordance with claim 1:

wherein a ring fedder connects the driving hub and the drive shaft, preventing relative rotations therebetween.

6. An apparatus for slicing wood chips such as in a pulp preparation procedure constructed in accordance with claim 4:

wherein a circumferential clamp forces the driving hub into frictional engagement with the drive shaft.

7. An apparatus for slicing wood chips such as in a pulp preparation procedure constructed in accordance with claim 6:

wherein said shear means includes a plurality of pins extending between said driving hub and said driven hub.

8. An apparatus for slicing wood chips such as in a pulp preparation procedure comprising in combination:

a power input rotary drive shaft means;

a rotor having anvil means for carrying wood chips against cutting knives and adapted to be driven by said shaft;

a power rotation clutch means connected between said shaft and said rotor accommodating relative rotation with forced stalling of the rotor;

the clutch means including;

a driven hub secured to the rotor;

a driving hub secured to the shaft;

and shear pin means between said hubs of a strength to transmit normal rotational operating power and to shear upon forced stalling of the rotor.

9. An apparatus for slicing wood chips such as in a pulp preparation procedure constructed in accordance with claim 8:

wherein said driven hub is rotatably mounted on the rotary drive shaft by bearing means permitting continued rotation of the power shaft with forced stalling of the rotor.

10. An apparatus for slicing wood chips such as in a pulp preparation procedure constructed in accordance with claim 9:

wherein said bearing means include first and second bearings spaced axially.

11. An apparatus for slicing wood chips such as in a pulp preparation procedure constructed in accordance with claim 9:

wherein said bearing means is located between said driven hub and said driving hub so that the driving hub rotates within the driven hub with forced stalling of the rotor.

12. An apparatus for slicing wood chips such as in a pulp preparation procedure constructed in accordance with claim 8:

wherein the driving hub is journalled on the shaft;

and including a circumferential clamp frictionally clamping the driving hub to the shaft.

13. An apparatus for slicing wood chips such as in a pulp preparation procedure, comprising in combination:

an outer housing supporting cutting knives in an annular pattern;

a rotor mounted within said housing for carrying wood chips against the cutting knives;

a shaft mounted coaxially with the rotor and adapted to drive the rotor;

a driven hub connected to the rotor for driving the rotor in rotation from power transmitted from the shaft;

a driving hub journalled on the shaft;

first and second radial plate means on the driving hub and driven hub respectively having mating faces in close proximity to each other;

strength to transmit rotational operating torque and to shear upon forced stalling of the rotor;

an elongate hub base on the driving hub;

an annular clamp forcing the base hub in frictional engagement with the drive shaft to transmit rotational power therebetween;

and axially spaced bearings on the hub base between the driven hub and driving hub accommodating continued rotation of the shaft with forced stalling of the rotor.

14. An apparatus for slicing wood chips such as for use in a pulp preparation procedure, comprising in combination:

a substantially cylindrical housing having a plurality of knives circumferentially exposed around and within the housing, said knives having cutting edges exposed to chips passed along the inner surface of the housing;

said housing having an axial dimension between a first end of said housing and a second end of said housing;

a rotary anvil means for carrying wood chips against said cutting edges, said rotary anvil means having a rotary anvil axial width and being rotational about an axis of said rotary anvil means and supported on a rotor;

said rotary anvil means having a plurality of vanes for carrying wood chips radially toward and circumferentially against said cutting edges, said vanes extending radially from near said axis of said rotary anvil means and housing and extending axially and radially;

a drive shaft for driving the rotor;

a driving hub mounted on the drive shaft;

a driven hub rotatably supported on the drive shaft and nonrotatably connected to the driving hub by axially extending shear pins extending between the hubs;

and an axially spaced bearing means supporting the driven hub on the driving hub for permitting continued rotation of the drive shaft with forced stalling of the rotor.

* * * * *

UNITED STATES PATENT AND TRADEMARK OFFICE
CERTIFICATE OF CORRECTION

PATENT NO. : 5,004,028
DATED : 04/02/91
INVENTOR(S) : James Adams et al

It is certified that error appears in the above—identified patent and that said Letters Patent is hereby corrected as shown below:

Column 6, Line 38: Should include --shear pins extending axially between said plates of a--.

Signed and Sealed this

Fourth Day of August, 1992

Attest:

DOUGLAS B. COMER

Attesting Officer

Acting Commissioner of Patents and Trademarks